(12) United States Patent
Hamilton

(10) Patent No.: US 7,430,330 B2
(45) Date of Patent: Sep. 30, 2008

(54) METHOD AND APPARATUS FOR OPTIMIZING A JPEG IMAGE USING REGIONALLY VARIABLE COMPRESSION LEVELS

(76) Inventor: Chris H. Hamilton, #220-767 Parkland Drive, Halifax, Nova Scotia (CA) B3S 1T1

( * ) Notice: Subject to any disclaimer, the term of this patent is extended or adjusted under 35 U.S.C. 154(b) by 589 days.

(21) Appl. No.: 11/091,711

(22) Filed: Mar. 28, 2005

(65) Prior Publication Data
US 2005/0213836 A1 Sep. 29, 2005

Related U.S. Application Data

(63) Continuation-in-part of application No. 09/759,150, filed on Jan. 16, 2001, now abandoned.

(51) Int. Cl.
*G06K 9/46* (2006.01)
*G06K 9/36* (2006.01)

(52) U.S. Cl. .................. 382/239; 382/250; 382/251

(58) Field of Classification Search ................ 382/239, 382/250, 251; 375/240.03, 240.2; 348/404.1, 348/405.1; 358/426.14
See application file for complete search history.

(56) References Cited

U.S. PATENT DOCUMENTS

| | | | | |
|---|---|---|---|---|
| 5,426,512 A | * | 6/1995 | Watson | 382/250 |
| 5,481,309 A | * | 1/1996 | Juri et al. | 375/240.03 |
| 5,677,689 A | * | 10/1997 | Yovanof et al. | 341/50 |
| 5,724,453 A | * | 3/1998 | Ratnakar et al. | 382/251 |
| 5,883,979 A | * | 3/1999 | Beretta et al. | 382/251 |
| 6,314,208 B1 | * | 11/2001 | Konstantinides et al. | 382/239 |
| 2001/0043754 A1 | * | 11/2001 | Memon et al. | 382/251 |

OTHER PUBLICATIONS

Chun et al. An Adaptive Perceptual Quantization Algorithm for Video Coding. IEEE Transactions on Consumer Electronics, vo. 39, No. 3, Aug. 1993, pp. 555-558.*
Konstantinides et al. A JPEG Variable Quantization Method for Compund Documents. IEEE Transactions on Image Processing, vol. 9, No. 7, Jul. 2000, pp. 1282-1287.*
Agrez. Dynamic of Non-Uniform A/D Conversion. Instrumentation and Measurement Technology Conference, 1999. IMT/99. Proceedings of the 16th IEEE, vol. 3, May 24-26, 1999, pp. 1667-1672.*
Pennebaker, et al. JPEG Still Image Data Compression Standard. Chapman & Hall, 1st Ed., pp. 305, 503.*

* cited by examiner

*Primary Examiner*—Colin LaRose
(74) *Attorney, Agent, or Firm*—Pequignot + Myers LLC

(57) ABSTRACT

A method of JPEG compression of an image frame divided up into a plurality of non-overlapping, tiled 8×8 pixel blocks $X_i$. A global quantization matrix Q is determined by either selecting a standard JPEG quantization table or selecting a quantization table such that the magnitude of each quantization matrix coefficient, $Q[m,n]$ is inversely proportional to the aggregate visual importance in the image of the corresponding DCT basis vector. Next a linear scaling factor $S_i$ is selected for each block, bounded by user selected values $S_{min}$ and $S_{max}$. Transform coefficients, $Y_i$, obtained from a digital cosine transform of $X_i$, are quantized with global table $S_{min} Q$ while emulated the effects of quantization with local table $S_i Q$ and the quantized coefficients $T_i[m,n]$ and global quantization table $S_{min} Q$ are entropy encoded, where $S_{min}$ is a user selected minimum scaling factor, to create a JPEG Part 1 image file. The algorithm is unique in that it allows for the effect of variable-quantization to be achieved while still producing a fully compliant JPEG Part 1 file.

12 Claims, 3 Drawing Sheets

METHOD AND APPARATUS FOR OPTIMIZING A JPEG IMAGE USING REGIONALLY VARIABLE COMPRESSION LEVELS

This application is a continuation-in-part of application Ser. No. 09/759,150 filed Jan. 16, 2001, now abandoned.

FIELD

The present invention relates generally to JPEG image compression, and more specifically to a method and apparatus for optimizing a JPEG Part 1 image using regionally variable compression levels.

BACKGROUND

Compression is a useful method for reducing bandwidth consumption and download times of images sent over data networks. A variety of algorithms and techniques exist for compressing images. JPEG, a popular compression standard that is particularly good at compressing photo-realistic images, is in common use on the Internet. This standard, described in "JPEG Still Image Data Compression Standard", by W. B. Pennebaker and J. L. Mitchell, Chapman & Hall, 1992, is based on a frequency domain transform of blocks of image coefficients. As seen in FIG. 1, JPEG calls for subdividing an image frame 12 into 8×8 pixel blocks 11 and at box 16 transforming the array of pixel values in each block 11 with a discrete cosine transform (DCT) so as to generate 64 DCT coefficients corresponding to each pixel block 11. The coefficients for each block 11 are quantized in quantization block 20 using a 64 element quantization table 24. Each element of table 24 is an integer value from 1 to 255, which specifies the step size of the quantizer for the corresponding DCT coefficients. The quantized coefficients for each block are entropy encoded in entropy coding box 28, which performs a lossless compression. The entropy encoder 28 is coupled to the output of the quantizer 20 from which the former receives quantized image data. Standard JPEG entropy coding uses either Huffman coding or arithmetic coding using either predefined tables or tables that are computed for a specific image.

The JPEG compressed image data is decompressed by the bottom circuit of FIG. 1 by being first passed through an entropy decoder 30. Next inverse quantization in block 32 using quantization table 34 is performed. Finally the inverse DCT transform block 36 performs an inverse DCT operation to produce the image pixel intensity data.

More specifically, the discrete cosine transform block uses the forward discrete cosine function (DCT) to transform the image pixel intensity $X[x,y]$ to DCT coefficients $Y[m,n]$ as follows:

$$Y[m,n] = \frac{1}{4C(m)C(n)} \left[ \sum_{x=0}^{7} \sum_{y=0}^{7} X\{x, y\} \cos\frac{(2x+1)m\pi}{16} \cos\frac{(2y+1)n\pi}{16} \right]$$

where $C(m)$ and $C(n)=1/\sqrt{2}$ for $m,n=0$, and $C(m)$ and $C(n)=1$

The next step is to quantize the DCT coefficients using a quantization matrix, which is an 8×8 matrix of step sizes with one element for each DCT coefficient. A tradeoff exists between the level of image distortion and the amount of compression, which results from the quantization. A large quantization step produces large image distortion, but increases the amount of compression. A small quantization step produces lower image distortion, but results in a decrease in the amount of compression. JPEG typically uses a much higher step size for the coefficients corresponding to high spatial frequency in the image, with little noticeable deterioration in the image quality because of the human visual system's natural high frequency rolloff. The quantization is actually performed by dividing the DCT coefficient $Y[m,n]$ by the corresponding quantization table entry $Q[m,n]$ and the result rounded off to the nearest integer according to the following:

$$T[m,n]=\text{round}(Y[m,n]/Q[m,n])$$

to give a quantized coefficient $T[m,n]$. This type of quantizer is sometimes referred to as a midtread quantizer. An approximate reconstruction of $Y[m,n]$ is effected in the decoder by entrywise multiplication of $T[m,n]$ by $Q[m,n]$ to obtain a reconstructed $Z[m,n]$:

$$Z[m,n]=Q[m,n]\,T[m,n]$$

The difference between $Y[m,n]$ and $Z[m,n]$ represents lost image information causing distortion to be introduced. The amount of this lost information is bounded by the magnitude of $Q[m,n]$.

In the case of an image with multiple color channels, the aforementioned steps are applied in a similar fashion to each channel independently. In general practice, the color channels are sub-sampled to achieve greater compression, without significantly altering the quality of the image reconstruction.

The quantization step is of particular interest since this is where information is discarded from the image. Ideally, one would like to discard as much information as possible, thereby reducing the stored image size, while at the same time maintaining or increasing the image fidelity. Within the standard there is no prescribed method of quantizing the image, but there is nonetheless a popular method used in the software of the Independent JPEG Group (ISO/IEC JTC1 SC29 Working Group 1), and employed extensively by the general community. This method involves scaling a predetermined quantization table (calculated from statistical importance of basis vectors over a large set of images) by a factor dependent on a user-set quality, which lies in the range 1-100. This method yields good results on average, but is based on statistical averages over many images, and doesn't address global image characteristics, let alone local characteristics.

V. Ratnakar and M. Livny. "RD-OPT: An efficient algorithm for optimizing DCT quantization tables." Proceedings DCC'95 (IEEE Data Compression Conference), pages 332-341, 1995 (and also U.S. Pat. No. 5,724,453) describe a rate-distortion dynamic programming optimization technique to reduce distortion for a given target bit-rate, or reduce bit-rate for a given target distortion. This reference uses "Mean Squared Error" as a measure of distortion and introduces some novel techniques for estimating bit-rate that improve the computational efficiency of the calculation. This algorithm is designed to calculate a single quantization table Q for each channel of the image, and it is based solely on global aggregate statistics. Also it does not take into account varying local image statistics. Moreover the method is computationally expensive. There exists another technique, which simultaneously optimizes the quantization and entropy encoding steps yielding a completely optimum JPEG file stream. This technique, however is extremely slow and unrealistic for real-time JPEG optimization.

U.S. Pat. No. 5,426,512 entitled "Image data compression having minimum perceptual error" uses a rate-distortion dynamic programming optimization technique to reduce distortion for a target bit-rate, or reduce bit-rate for a target distortion. This technique is very similar in concept to V. Ratnaker et al., except that the latter uses a "perceptual error" measure which attempts to mimic the eye's sensitivity to error. This algorithm is designed to calculate a single quantization table Q for each plane of the image, and it is based solely on global aggregate statistics, and it does not take into account varying local image characteristics.

U.S. Pat. No. 5,883,979 entitled "Method for selecting JPEG quantization tables for low bandwidth applications" is directed mainly at preserving text features in JPEG images at very low bit-rates. It uses image analysis based on global statistics to determine which DCT basis vectors are more visually important to the image, and weights them accordingly in the quantization table. Again, this algorithm is based on global statistics and also it is geared specifically for preserving textual data in JPEG images.

Ideally, one would like to have an optimal quantization table for every significantly different region of the image (a technique adopted for example in MPEG), which would then allow one to increase image fidelity as a function of file size; this technique of using different quantization tables for different areas of an image is generally referred to as variable quantization. In variable quantization, the figures of merit in question are image quality (distortion) and output file size (rate). The problem is then to decrease image distortion for a target rate, or to decrease rate for a target distortion. Of particular interest is the latter, since it has direct application in minimizing bandwidth usage for images which are sent over computer networks. This also reduces the time to transmit the image, which is important when the network path includes slow speed links.

JPEG Part 3 (ISO/IEC 10918-3), approved in 1995, defines extensions to the JPEG standard that allow for variable quantization. Unfortunately, these extensions are not supported by most applications (including most web browsers, and the IJG reference implementation).

U.S. Pat. No. 6,314,208 entitled "System for variable quantization in JPEG for compound documents" describes a system for determining variable quantization local scaling factors using a block classifier that separates text and picture information. This algorithm effectively employs variable quantization but requires the use of extensions only introduced in JPEG Part 3.

Similarly, US Patent Application No. 2001/0043754 describes a method for determining local scaling factors based on perceptual classification performed in the spatial domain. This algorithm also presupposes use of JPEG Part 3 extensions.

It is preferred that any technique for quantizing an image also be computationally efficient, especially when the quantization is performed on images which are generated dynamically, or images which cannot be stored in a caching system. If the quantization is too slow, then any transmission time benefit realized from the reduction in rate is effectively annulled by the latency introduced in the quantization computation.

Accordingly, it is an object of the invention to provide a method for quantizing a JPEG image, which offers many of the benefits of variable quantization and is computationally efficient, while conforming to the widely used JPEG Part 1 standard.

SUMMARY OF THE INVENTION

According to the present invention there is provided a method, which is directed towards regionally variable levels of compression. The method is directed to JPEG compression of an image frame divided up into non-overlapping 8×8 pixel blocks $X_i$. The method includes forming a discrete cosine transform (DCT) of each block $X_i$ of the image frame to produce a matrix of blocks of transform coefficients $Y_i$. Next a visual importance, $I_i$, is calculated for each block of the image, based upon assigning zeros for flat features and values approaching unity for sharply varying features. A global quantization matrix Q is then formed such that the magnitude of each quantization matrix coefficient Q[m,n] is inversely proportional to the aggregate visual importance of the corresponding DCT basis vector to the image. The local visual importance is used during the quantization stage, where for regions of lower detail, more data is discarded, resulting in more aggressive compression. In the quantization stage the transform coefficients are pseudo-quantized by the quantization matrix $S_i$ Q, where $S_i$ is a linear scaling factor, to create a JPEG Part 1 image file. This algorithm is unique in that it allows for the effect of variable-quantization to be achieved while still producing a file which conforms to the JPEG Part 1 standard.

The visual importance, $I_i$ may be determined by discrete edge detection and summation of transform coefficients. This determination of $I_i$ may include creating a 24×24 matrix of image pixels of DCT coefficients centered on a block $X_i$. The center 10×10 matrix of the 24×24 matrix may be convolved with an edge-tracing kernel. The values of the convolved matrix may be summed, and the summed value normalized to produce a visual importance, $I_i$.

The global quantization matrix, Q, may be formed by calculating an 8×8 matrix A by calculating matrix elements A[m,n] according to the formula:

$$A[m,n] = \sum_{all\ i} I_i Y_i[m,n]$$

The elements of an intermediate matrix B may then be calculated according to the formula:

$$B[m,n] = A_{max}/A[m,n]$$

where $A_{max}$=max{all entries of A}. A scaling factor s is calculated that minimizes the quantity $|s\ B-Q_{std}|$, where $Q_{std}$ is a chosen standard quantization matrix. The quantization matrix is then calculated as Q=s B.

The linear scaling factors $S_i$ may be set equal to $I_i(S_{max}-S_{min})+S_{min}$, where $S_{max}$ and $S_{min}$ are user selected.

Variable quantization may be approximated by first uniformly quantizing a DCT coefficient block $Y_i$ by the global quantization matrix $Q_{min}=S_{min}$ Q according to the standard formula:

$$T_i[m,n]=\text{round}(Y_i[m,n]/Q_{min}[m,n])$$

Let P(x) be a function that returns the nearest integer of the form $2^k-1$ that is smaller than the positive integer x:

$$P(x)=2^{floor(lg(x))}-1$$

Let $Evq_i[m,n]$ be the error that would be introduced to the coefficient Y[m,n] by uniform quantization with a local quantization matrix $S_i$ Q, and let $Ernd_i[m,n]$ be the error introduced by rounding down the coefficient $T_i[m,n]$ to the nearest smaller integer of the form $2^k-1$:

$$Evq_i[m,n]=|S_iQ[m,n]\text{round}\ Y_i[m,n]/S_i[m,n]Q[m,n]))-Y_i[m,n].$$

$$Ernd_i[m,n]=|Q_{min}[m,n]P(abs(T_i[m,n]))-abs(Y_i[m,n])|$$

Variable quantization may be approximated by modifying each uniformaly quantized coefficient $T_i[m,n]$ as follows:

1. If round($Y_i[m,n]/(S_i\ Q))=0$, then $T_i[m,n]=0$.
2. Otherwise, if $Ernd_i[m,n] <=Evq_i[m,n]$ then $T_i[m,n]=\text{sign}(T_i[m,n])\ P(abs(T_i[m,n]))$.

Step 1 serves to erase any coefficients that would have been erased had they truly been quantized by a local quantization matrix $S_i\ Q$. Step 2 decreases values in order to guarantee a smaller Huffman representation if the error introduced in doing so is less than or equal to the error that would have been introduced by variable quantization.

According to another aspect of the invention there is provided a method of JPEG compression of a colour image represented by channels Y for greyscale data, and U and V each for colour, which comprises shrinking the colour channels U and V by an integer fraction of their size, forming a discrete cosine transform (DCT) $Y_i$ for each block $X_i$ of each of channels Y, U and V and calculating a visual importance, $I_i$, for each Y channel block of each image and setting $I_i=\max\{I_i$ values for corresponding Y channel blocks$\}$ for blocks in the U and V channels. A global quantization matrix Q is formed for the Y channel block and one for channels U and V combined such that a magnitude of each quantization matrix coefficient $Q[m,n]$ is inversely proportional to an aggregate visual importance in the image of the corresponding DCT basis vector. Next the transform coefficients for each of the Y, U and V channels are variable-quantized by the matrix $S_{min}Q$ and local parameter $S_i$, where $S_i$ is a linear scaling factor, Q is the global quantization table for the associated channel being quantized, and $S_{min}$ is a user determined scaling factor. Finally, the quantized coefficients $Y_i[m,n]$ and the global uniform quantization table $Q_{min}=S_{min}\ Q$ are entropy encoded to create a JPEG Part 1 image file for each of channels Y, U and V.

Preferably, the subsampling factor is 2.

In another aspect of the invention there is provided an apparatus for JPEG compression of an image frame divided up into a plurality of non-overlapping, tiled 8×8 pixel blocks $X_i$. The apparatus includes a discrete cosine transformer (DCT) operative to form the discrete cosine transform of each block $X_i$ of the image frame to produce blocks of transform coefficients $Y_i$, a visual importance calculator operative to calculate the visual importance, $I_i$, for each block of the image, based upon assigning zeros for flat features and values approaching unity for sharply varying features and a global quantization matrix calculator operative to calculate the global quantization matrix, Q, by one of (i) selecting a standard JPEG quantization table and
(ii) selecting a quantization table such that the magnitude of each quantization matrix coefficient $Q[m,n]$ is inversely proportional to the visual importance in the image of the corresponding DCT basis vector.

A linear scaling factor calculator determines a linear scaling factor, $S_i$, based on user established values of $S_{max}$ and $S_{min}$, and the visual importance value $I_i$. A pseudo-variable-quantizer emulates the effects of quantizing a block $Y_i$ by the local quantization matrix $S_i\ Q$ but produces coefficients $T_i$ actually uniformly quantized by the global quantization matrix $S_{min}$ Q. An entropy coder encodes the quantized coefficients $T_i$ and global quantization matrix $S_{min}\ Q$ to create a JPEG Part 1 image file.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION WITH REFERENCE TO THE DRAWINGS

The following algorithm, described below, is used to optimize JPEG images for delivery over low bandwidth connections. In general it can be used anywhere where higher JPEG compression ratios are desired while not noticeably degrading image quality.

Figure 1:
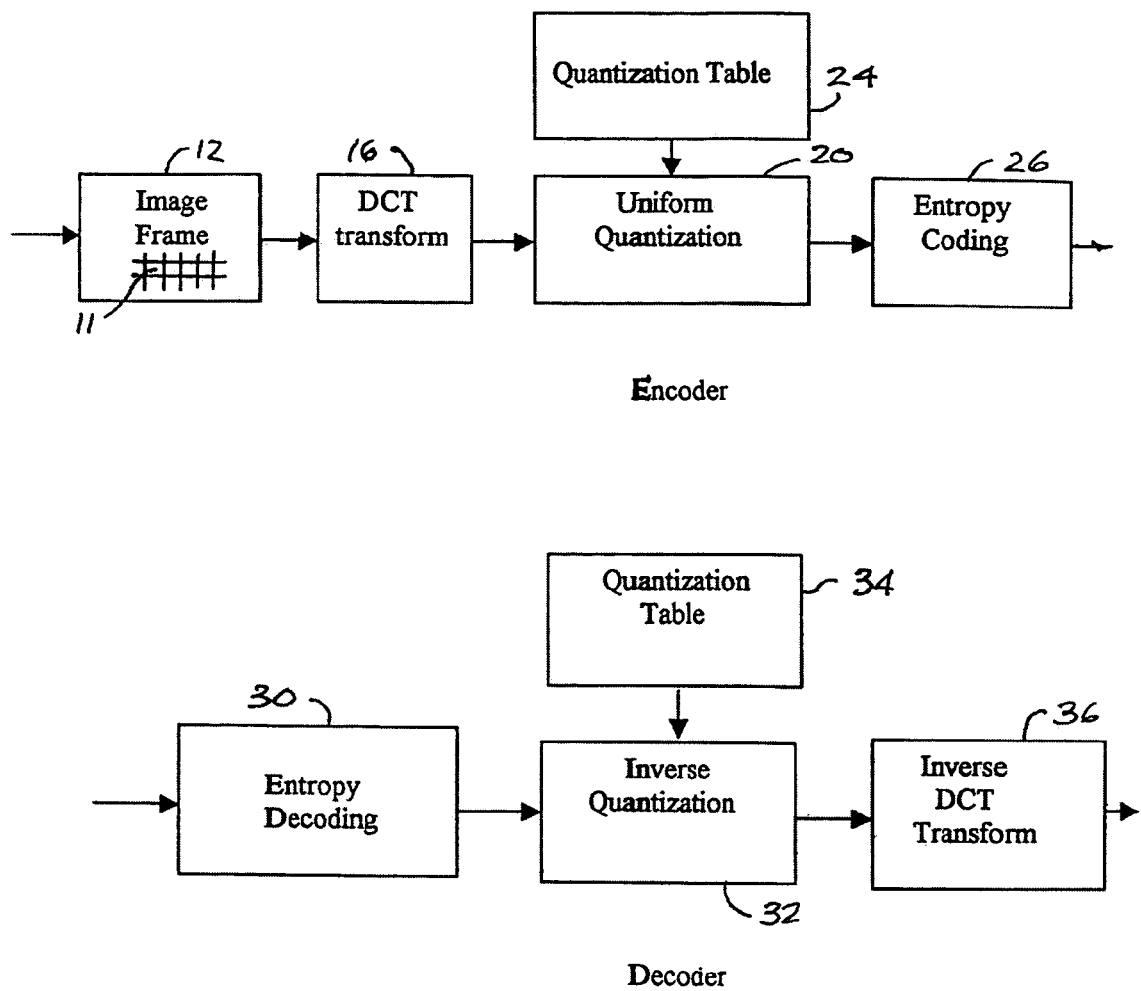
FIG. 1 is a schematic diagram showing a conventional JPEG system.
Figure 2:
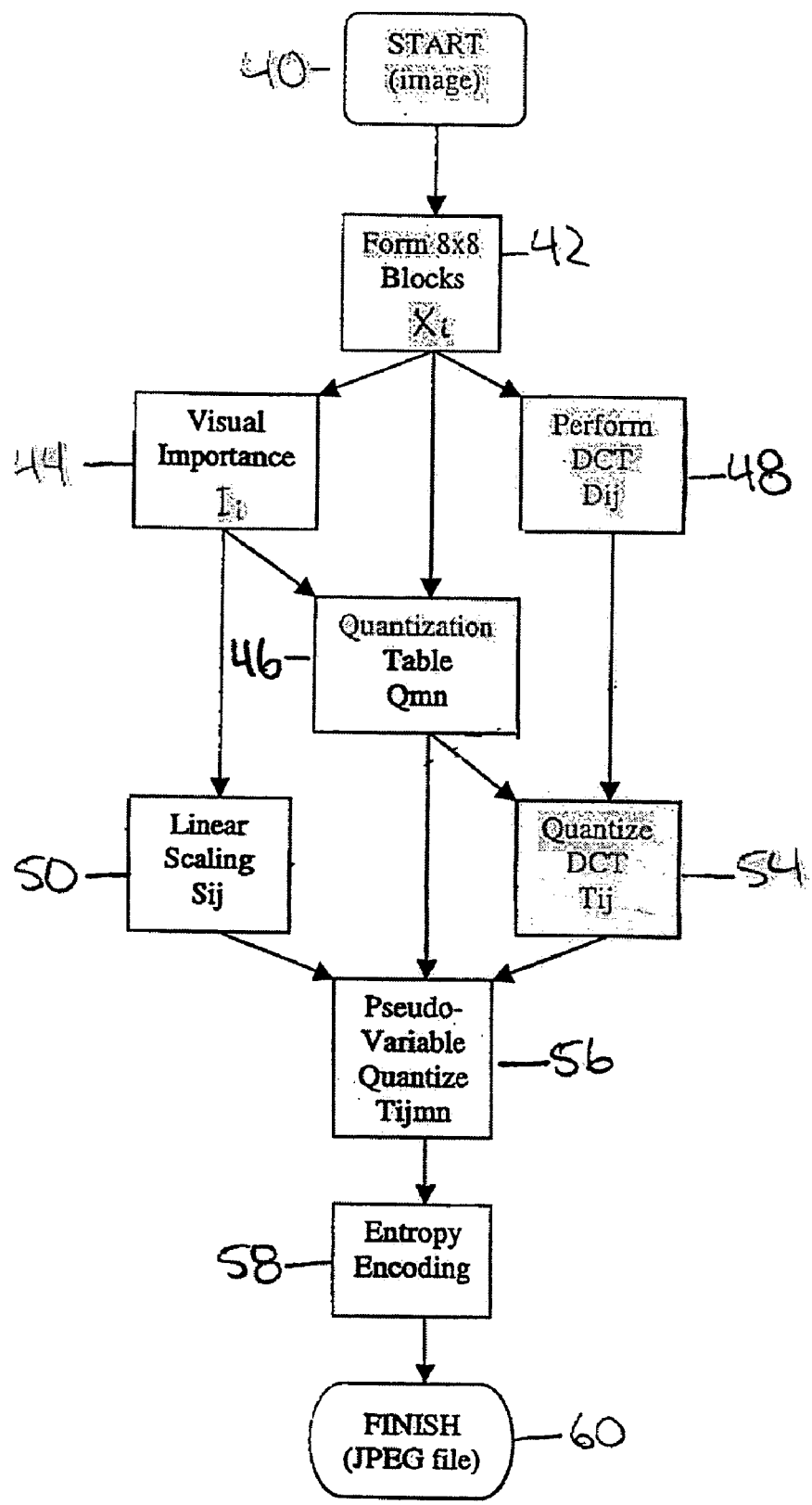
FIG. 2 is a flowchart showing the sequence of steps in the algorithm.

A description of the algorithm in accordance with the flowchart in FIG. 2 is given below:

An image frame is selected at step 40. The image frame is divided into non-overlapping tiled 8×8 pixel blocks $B_{ij}$ at step 42 according to the JPEG standard.

For each 8×8 block $X_i$ in the image frame, a visual image importance $I_i$ is calculated at step 44. Note that the actual measure of visual importance is not important to the outline of the algorithm. The $I_i$ values exhaustively cover the range [0,1], and are a measure of how aggressively the block can be quantized. A value of $I_i=0$ indicates that the visual appearance of the block is rather insensitive to the level of quantization, and a value of $I_i=1$ indicates that the visual appearance of the block is very sensitive to the level of quantization.

One method of selecting the visual importance $I_i$ is based on a discrete edge-detection and summation technique. Consider a 24×24 window $W_i$ on the image defined by the nine image blocks centered around the block $X_i$. From this 24×24 window, the matrix $V_i$ of the center 10×10 pixels are then convolved with a standard Laplacian edge detection kernel G, to give $H_i$. The edge detection kernel employed is, $$G = \begin{bmatrix} 1 & 1 & 1 \\ 1 & -8 & 1 \\ 1 & 1 & 1 \end{bmatrix}$$

and the convolution is given by, $$H_i[m,n] = \sum_{x,y} V_i[m-x, n-y]G[x,y]$$

This technique is essentially the discrete equivalent of taking the second derivative of the image in both dimensions. The output of the convolution $H_i$ is scaled to cover an 8-bit range between 0 and 255, the same range taken by the actual pixels in the image. The convolved values are then summed, and the sum is divided by 100*255 to scale the sum to the range 0 to 1. This scaled sum is denoted as $K_i$. This sum is then renormalized using the following function:

$$I_i = K_i(100+C)/(100\,K_i+C)$$

where C is equal to 14. This function is determined statistically, and remaps the $K_i$ values such that they lie on a normal distribution.

The above procedure is used to calculate $I_i$ for each block in the image. The end result is a value for each $I_i$ which is bounded on the interval [0,1], takes values of 0 for flat blocks, and values approaching 1 for blocks that have lots of sharp, short features (in other words have large second derivatives).

The quantization matrix Q is determined at step 46. In one approach, Q is simply set equal to the standard JPEG quantization table, which is in general use by the community. An example of a suitable such matrix is the following:

| 6, | 11, | 10, | 16, | 24, | 40, | 51, | 61, |
|---|---|---|---|---|---|---|---|
| 12, | 12, | 14, | 19, | 26, | 58, | 60, | 55, |
| 14, | 13, | 16, | 24, | 40, | 57, | 69, | 56, |
| 14, | 17, | 22, | 29, | 51, | 87, | 80, | 62, |
| 18, | 22, | 37, | 56, | 68, | 109, | 103, | 77, |
| 24, | 35, | 55, | 64, | 81, | 104, | 113, | 92, |
| 49, | 64, | 78, | 87, | 103, | 121, | 120, | 101, |
| 72, | 92, | 95, | 98, | 112, | 100, | 103, | 99 |

In another approach, an image-specific quantization matrix is generated, where the magnitude of each quantization table coefficient is inversely proportional to the importance in the image of the corresponding basis vector.

One approach to generating an image-specific quantization matrix Q defines an 8×8 array such that each value A[m,n] is equal to the sum of the corresponding coefficients (m,n) in each block $Y_i$, weighted by the importance value $I_i$:

$$A[m, n] = \sum_{all\ i} I_i Y_i[m, n]$$

After this summation, the matrix A holds relative counts of importance for each basis vector in the DCT transform. This matrix is simply inverted and scaled entry-wise such that B[m,n]=max{entries of A}/A[m,n]. In the cases where A[m,n] is zero, B[m,n] is set to 255, which is the largest allowable value for an 8 bit number. The values in B[m,n] are then scaled by a factor s such that the squared error between sB and a standard quantization matrix is minimized. The quantization matrix Q is then set equal to this scaled matrix sB. Note that this process is only performed on the AC coefficients, in other words for all values of (m,n) except (0,0). For the (0,0) entry, $Q_{00}$ is simply initialized to the corresponding value in the standard quantization table.

Each block $X_i$ is DCT transformed at step 48 according to the JPEG standard to produce DCT coefficients $Y_i$.

For each block $X_i$ in the image, a value $S_i$ is calculated at step 50 where $S_i = I_i(S_{max} - S_{min}) + S_{min}$. The parameters $S_{max}$ and $S_{min}$ are user specified and in effect define the quality bounds over which the image will be variably quantized. This method is preferably used to remove redundant data from an existing compressed JPEG by letting $S_{min}$ be equal to the actual scaling value used in compressing the image originally, and using a user-defined value for $S_{max}$.

Each block $X_i$ in the image is "pseudo-quantized" at step 56 with the quantization table $S_i Q$. This pseudo-quantization in effect emulates variable quantization while actually quantizing with the global quantization matrix $S_{min} Q$. If one lets $Y_i$ be the original unquantized DCT transformed image block, and $T_i$ the quantized DCT transformed block at step 54, then the algorithm for the pseudo-quantization can be described as given next.

The algorithm has three distinct quantization steps. In the first step, the coefficients in the block $Y_i$ are quantized using the standard JPEG quantization function with $S_{min}$ as the scaling value:

for each block $Y_i$ do
    for each coefficient $Y_i[m,n]$ in block $Y_i$ do $$T_i[m,n] = \text{round}(Y_i[m,n]/(S_{min} Q[m,n]))$$

where round denotes rounding to the nearest integer.

In the next step, if any coefficient $T_i[m,n]$ is >0, then if round($Y_i[m,n]/(S_i Q[m,n])$)=0 then $T_i[m,n]$=0

In the third and final step, if $T_i[m,n]$ is still greater than zero, and if the coefficient can be rounded down by one logarithm base-2 and not exceed the rounding error introduced by the quantization with the local quantization table, then it is so rounded down:

if $\text{Ernd}_i[m,n] <= \text{Evq}_i[m,n]$ then $$T_i[m,n] = \text{sign}(T_i[m,n])\, P(\text{abs}(T_i[m,n]))$$

where $\text{Ernd}_i$, $\text{Evq}_i$ and P are as defined earlier.

The algorithm in its entirety is:

```
for each block Y_i do
{
    for each coefficient Y_i[m, n] in block Y_i do
    {
        T_i[m, n] = round(Y_i[m, n]/(S_min Q[m, n]))
        if T_i[m, n] > 0 then
        {
            if round(Y_i[m, n]/(S_i Q[m, n])) = 0 then T_i[m, n] = 0
            else
            {
                if Ernd_i[m, n] <= Evq_i[m, n] then
                    T_i[m, n] = sign(T_i[m, n])P(abs(T_i[m, n]))
            }
        }
    }
}
```

The above pseudo-code has the effect of zeroing any coefficients that would have been zeroed if $Y_i$ were quantized with the local quantization table $S_i Q$, but were not zeroed when quantized with the global quantization table $S_{min} Q$. Also, it rounds down in magnitude (by one power of two) any coefficient that may be so rounded and not introduce more relative error in reconstruction than if that coefficient were truly quantized by $S_i Q$. This has the net effect of pseudo-quantizing $Y_i$ with the local table $S_i Q$, while actually quantizing the coefficients with the global table $S_{min} Q$.

Finally, the quantized blocks $T_i$ and the global quantization table $S_{min} Q$ are entropy encoded at step 58 to create a JPEG Part 1 image file 60 in accordance with the JPEG algorithm while still producing a fully compliant JFIF stream.

It should be noted that the algorithm is particularly useful in optimizing JPEG images that have already been quantized using the standard JPEG quantization table at a level $S_{min}$. By definition $S_i >= S_{min}$, hence the algorithm guarantees that the optimized JPEG will never be larger in size than the original JPEG, and will in almost all instances be smaller. At the same time the pseudo-variable-quantization ensures that the image quality remains essentially unchanged to the human observer.

For the sake of clarity, the algorithm has been presented assuming the image contains a single 8-bit channel per pixel, in other words it is a greyscale image. However, the algorithm is easily extended to full color (3 channel) images, and more generally, n channel images with few adjustments to the process. In general, the algorithm is simply applied to each channel independently, where the visual importance values are calculated on the luminance channel. A single quantization matrix Q can be employed for all channels, or alternatively, a separate quantization matrix can be used for each channel. Likewise, $S_{min}$ and $S_{max}$ can either be the same for all channels, are vary from channel to channel.

It is common practice to sub-sample one or more channels when color images are coded. The algorithm can still be employed in this case. An example using a full color, 3-channel image will be described.

A common color scheme to represent a color image is know as YUV. Here, Y stands for the luminance channel (or the greyscale data), and U and V are the blue and red chrominance (color) channels respectively. Since the human visual system perceives luminance information much better than color data, the U and V channels are typically sub-sampled by an integer factor, normally 2, to improve compression. In this case, in the original pixel domain the image is shrunk to half its original size, and then DCT transformed. When decoding, the inverse transform is applied and the plane is expanded by twice its size before merging the three channels to reconstruct the original image.

Because of the subsampling, there may be up to four Y channel blocks that correspond to the same region of an image covered by one U and V block. In this case, the visual importance $I_i$ that is used in the U and V channels is simply given as, max {all corresponding $I_i$ values from the Y channel}.

Figure 3:
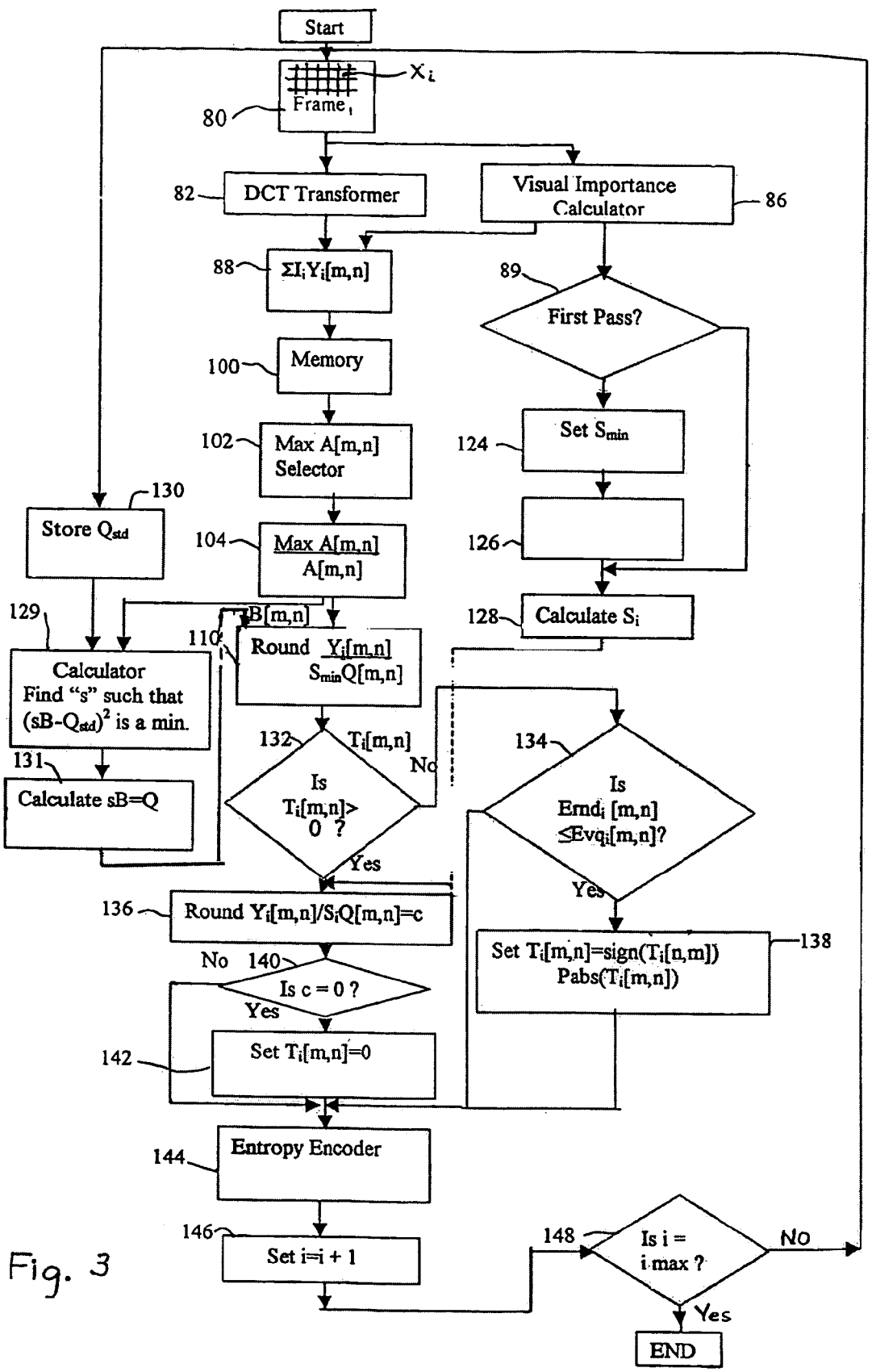
FIG. 3 is a schematic diagram of the JPEG image compressor.

Referring to FIG. 3 the apparatus for JPEG Compression using the above algorithm consists of a frame grabber 80 into which non-overlapping, tiled, 8×8 image pixel blocks $X_i$ are stored temporarily. For each block, $X_i$, the digital cosine transform (DCT) is calculated by DCT transformer 82 and the resultant transform coefficients $Y_i$ stored in memory 84. A visual importance calculator 86 calculates values of the visual importance, $I_i$, for each block $X_i$. A global quantization calculator 87 calculates elements Q[m,n] of a global quantization matrix utilizing $I_i$ and $Y_i$. A linear scaling factor calculator 89 uses user set values of $S_{min}$ and $S_{max}$ set in blocks 124 and 126, respectively, and $I_i$ to determine $S_i$ in calculator 128 for quantized blocks $T_i$.

More particularly, values of the quantization matrix Q are calculated by first forming the sum of the product of the visual importance $I_i$ and the elements of blocks $Y_i$ in block 88 to form the elements A[m,n] in an 8×8 array which are stored in memory 100. The maximum value "Max A[m,n]" in the array is selected by Max A[m,n] selector 102. The elements B[m,n] of the intermediate matrix B are calculated as B[m,n]=(Max A[m,n])/A[m,n] in block 104. The scaling factor s is determined by calculator 129 to minimize the error between s B and user defined standard quantization matrix $Q_{std}$ set in block 130. The quantization matrix Q is calculated as Q=s B in calculator 131.

In block 106, the quotient of $Y_i[m,n]/(S_{min} Q[m,n])$ is rounded to the nearest integer yielding elements $T_i[m,n]$. In comparator 108, the calculated value of $T_i[m,n]$ is compared with zero and, if greater than zero, in block 110 the quotient $Y_i[m,n]/(S_i Q[m,n])$ is calculated and then rounded to the nearest integer. If the quotient $Y_i[m,n]/(S_i Q[m,n])$ equals zero, then $T_i[m,n]$ is set equal to zero at block 112. If the quotient $Y_i[m,n]/(S_i Q[m,n])$ is not equal to zero, at block 110, then the value of the rounded value of the latter quotient is transferred to block 116. Values calculated in blocks 116 and 118 are compared in calculator 120 and if the value calculated in block 116 is less than or equal to the value calculated in block 118, then the value of $T_i[m,n]$ is set equal to sign($T_i[m,n]$) P(abs($T_i[m,n]$)). The blocks of quantized coefficients $T_i$ and the global quantization table $S_{min} Q$ are entropy encoded by entropy encoder 113.

I claim:

1. A method of JPEG compression of an image frame divided up into a plurality of non-overlapping, tiled 8×8 pixel blocks $X_i$ comprising:
    (a) forming a discrete cosine transform (DCT) of each block $X_i$ of the image frame to produce a matrix of blocks of transform coefficients $Y_i$;
    (b) calculating a visual importance, $I_i$, for each block of the image, based upon assigning zeros for flat features and values approaching unity for sharply varying features;
    (c) forming a global quantization matrix Q by one of
        (i) selecting a standard JPEG quantization table and
        (ii) selecting a quantization table such that the magnitude of each quantization matrix coefficient Q[m,n] is inversely proportional to the aggregate visual importance in the image of a corresponding DCT basis vector; and
    (d) calculating linear scaling factors $S_i$ defining bounds over which the image is to be variably quantized;
    (e) approximating variable quantization of the transform coefficients, $Y_i[m,n]$, using the local quantization table $S_i Q$ while actually producing coefficients $T_i[m,n]$ that have been quantized using global quantization table $S_{min} Q$ where $S_{min}$ is a scaling value used in compressing the image that defines the quality bounds over which the image will be variably quantized; and
    (f) entropy encoding quantized coefficients $T_i[m,n]$ and global quantization table $S_{min} Q$ to create a JPEG Part 1 image file.

2. A method according to claim 1, wherein step (e) includes rounding $Y_i[m,n]/(S_{min} Q[m,n])$ to the nearest integer to form quantized DCT transformed coefficients $T_i[m,n]$;
    (f) setting $T_i[m,n]=0$ if round $(Y_i[m,n]/(S_i Q[m,n]))=0$; and
    (g) setting $T_i[m,n]=\text{sign}(T_i[m,n])$ P($T_i[m,n]$) if $\text{Ernd}_i[m,n]$ is less than or equal to $\text{Evq}_i[m,n]$ wherein P(x)=$2^{floor(lg(x))}-1$ and $T_i[m,n]$ and wherein $\text{Ernd}_i(m,n)$ is the error introduced by rounding down the coefficient $T_i(m,n)$ to the nearest smaller integer of the form $2^k-1$ and wherein Evg(m,n) is the error that would be introduced to the coefficient Y[m,n] by uniform quantization with a local quantization matrix $S_i Q$.

3. A method according to claim 1, including calculating a linear scaling factor $S_i$ equal to $I_i*(S_{max}-S_{min})+S_{min}$ where $S_{min}$ and $S_{max}$ are user specified to define bounds over which the image will be variably quantized.

4. The method according to claim 1, where $I_i$ is determined by discrete edge detection and summation of transform coefficients.

5. The method according to claim 1, wherein $I_i$ is determined by creating a 24×24 matrix of image pixels of DCT coefficients centered on a block $X_i$, convolving said 24×24 matrix with an edge tracing kernel to produce a convolved matrix, summing center 10×10 matrix values of said convolved matrix to produce a summed value, and normalizing said summed value to produce a visual importance, $I_i$.

6. The method according to claim 1, wherein the global quantization matrix Q of item c (ii) is formed by calculating an 8×8 matrix A by calculating matrix elements A[m,n] of said A according to the formula $$A[m, n] = \sum_{all\ i} I_i Y_i[m, n]$$

calculating elements $Q_{min}$ of said Q according to the formula $Q[m,n]$=max(entries of A)/$A[m,n]$ and scaling coefficients of Q by a constant factor a for all values of (m,n) except (0,0) in order to minimize an error between Q and a standard JPEG quantization matrix.

7. A method of JPEG compression of an image frame divided up into a plurality of non-overlapping, tiled 8×8 pixel blocks $X_i$, comprising:
  (a) forming a discrete cosine transform (DCT) of each block $X_i$ of the image frame to produce a matrix of blocks of transform coefficients $Y_i$;
  (b) calculating a visual importance, $I_i$, for each block of the image, based upon assigning zeros for flat features and values approaching unity for sharply varying features;
  (c) forming a global quantization matrix Q by one of
    (i) selecting a standard JPEG quantization table and
    (ii) selecting a quantization table such that the magnitude of each quantization matrix coefficient Q[m,n] is inversely proportional to the aggregate visual importance to the image of a corresponding DCT basis vector; and
  (d) selecting a linear scaling factor $S_i$ defining bounds over which the image is to be variably quantized wherein $S_i=I_i(S_{max}-S_{min})+S_{min}$ where $S_{max}$ and $S_{min}$ are user selected;
  (e) quantizing the transform coefficients, $Y_i[m,n]$, to produce quantized blocks $T_i[m,n]$ as follows:
    (i) $T_i[m,n]$=round($Y_i[m,n]/(S_{min} Q[m,n])$), where round denotes rounding to the nearest integer;
    (ii) setting $T_i[m,n]$=0 if round $(Y_i[m,n]/(S_i Q[m,n]))$=0; and
    (iii) setting $T[m,n]$=sign($T_i[m,n]$) P(abs($T_i[m,n]$)) if $Ernd_i[m,n]$ is less than or equal to $Evq_i[m,n]$ wherein $P(x)=2^{floor(lg(x))}-1$ and $T_i[m,n]$ and wherein $Ernd_i(m,n)$ is the error introduced by rounding down the coefficient $T_i(m,n)$ to the nearest smaller integer of the form $2^k-1$ and wherein Evq(m,n) is the error that would be introduced to the coefficient Y[m,n] by uniform quantization with a local quantization matrix $S_i Q$;
  (f) entropy encoding quantized coefficients $T_i[m,n]$ and global quantization matrix $S_{min}$ Q, to create a JPEG Part 1 image file.

8. A method of JPEG compression of a colour image represented by channels Y for greyscale data, and U and V each for colour, comprising:
  (a) subsampling the colour channels U and V by an integer fraction of their size;
  (b) forming a discrete cosine transform (DCT) $Y_i$ for each block $X_i$ of each of channels Y, U and V;
  (c) calculating a visual importance, $I_i$, for each Y channel block of each image arid setting $I_i$=max$\{I_i$ values for corresponding Y channel blocks$\}$ for blocks in the U and V channels;
  (d) forming a global quantization matrix Q for the Y channel block and one for channels U and V combined such that a magnitude of each quantization matrix coefficient Q[m,n] is inversely proportional to the aggregate visual importance in the image of a corresponding DCT basis vector; and
  (e) approximating variable quantization of the transform coefficients, $Y_i[m,n]$, using the local quantization table $S_i$ Q while actually producing coefficients $T_i[m,n]$ that have been quantized using global quantization table $S_{min}$ Q, where Q is the global quantization table for the associated channel being quantized; and
  (f) entropy encoding quantized coefficients $T_i[m,n]$ and global quantization table $S_{min}$ Q, where $S_{min}$ is a user selected minimum scaling factor for each of channels Y, U, and V, to create a JPEG Part 1 image file for each of channels Y, U and V.

9. The method of claim 8 wherein the subsampling factor is 2.

10. Apparatus for JPEG compression of an image frame divided up into a plurality of non-overlapping, tiled 8×8 pixel blocks $X_i$ comprising:
  (a) a discrete cosine transformer (DCT) operative to form the discrete cosine transform of each block $X_i$ of the image frame to produce blocks of transform coefficients $Y_i$;
  (b) a visual importance calculator operative to calculate the visual importance, $I_i$, for each block of the image, based upon assigning zeros for flat features and values approaching unity for sharply varying features;
  (c) a global quantization matrix calculator operative to calculate the global quantization matrix, Q, by one of
    (i) selecting a standard JPEG quantization table and
    (ii) selecting a quantization table such that the magnitude of each quantization matrix coefficient Q[m,n] is inversely proportional to the aggregate visual importance in the image of a corresponding DCT basis vector; and
  (d) a linear scaling factor calculator operative to determine a linear scaling factor, $S_i$, defining bounds over which the image is to be variably quantized based on user established values of $S_{max}$ and $S_{min}$;
  (e) a variable quantization calculator operative to approximate variable quantization of the transform coefficients, $Y_i[m,n]$, using the local quantization table $S_i$ Q while actually producing coefficients $T_i[m,n]$ that have been quantized using global quantization table $S_{min}$ Q, where $S_{min}$ is a user selected minimum scaling factor; and
  (f) an entropy encoder operative to encode the quantized coefficients $T_i[m,n]$ and global quantization table $S_{min}$ Q to create a JPEG Part 1 image file.

11. Apparatus according to claim 10, wherein said quantizer rounds/$(S_{min}*Q)$ $Y_i[m,n]/(S_{min}$ $Q[m,n]$ to the nearest integer to form quantized DCT transformed coefficients $T_i[m,n]$ and (f) sets $T_i[m,n]=0$ if round $(Y_i[m,n]/(S_i Q[m,n]))=0$; and (g) sets $T_i[m,n]=\text{sign}(T_i[m,n]) P(\text{abs}(T_i[m,n]))$ if $\text{Ernd}_i[m,n]$ is less than or equal to $\text{Evq}_i[m,n]$ wherein $P(x)=2^{\text{floor}(lg(x))-1}$ and $T_i[m,n]$ and wherein $\text{Ernd}_i(m,n)$ is the error introduced by rounding down the coefficient $T_i(m,n)$ to the nearest smaller integer of the form $2^k-1$ and wherein $\text{Evg}(m,n)$ is the error that would be introduced to the coefficient $Y[m,n]$ by uniform quantization with a local quantization matrix $S_iQ$.

12. Apparatus according to claim 10, wherein said linear scaling factor calculator determines a linear scaling factor $S_i$ equal to $I_i (S_{max}-S_{min}$ where $S_{min}$ and $S_{max}$ are user specified to define bounds over which the image will be variably quantized.

* * * * *